Sept. 20, 1960 A. PREISMAN 2,953,677
RADIO JAMMING SYSTEMS
Filed Jan. 4, 1943
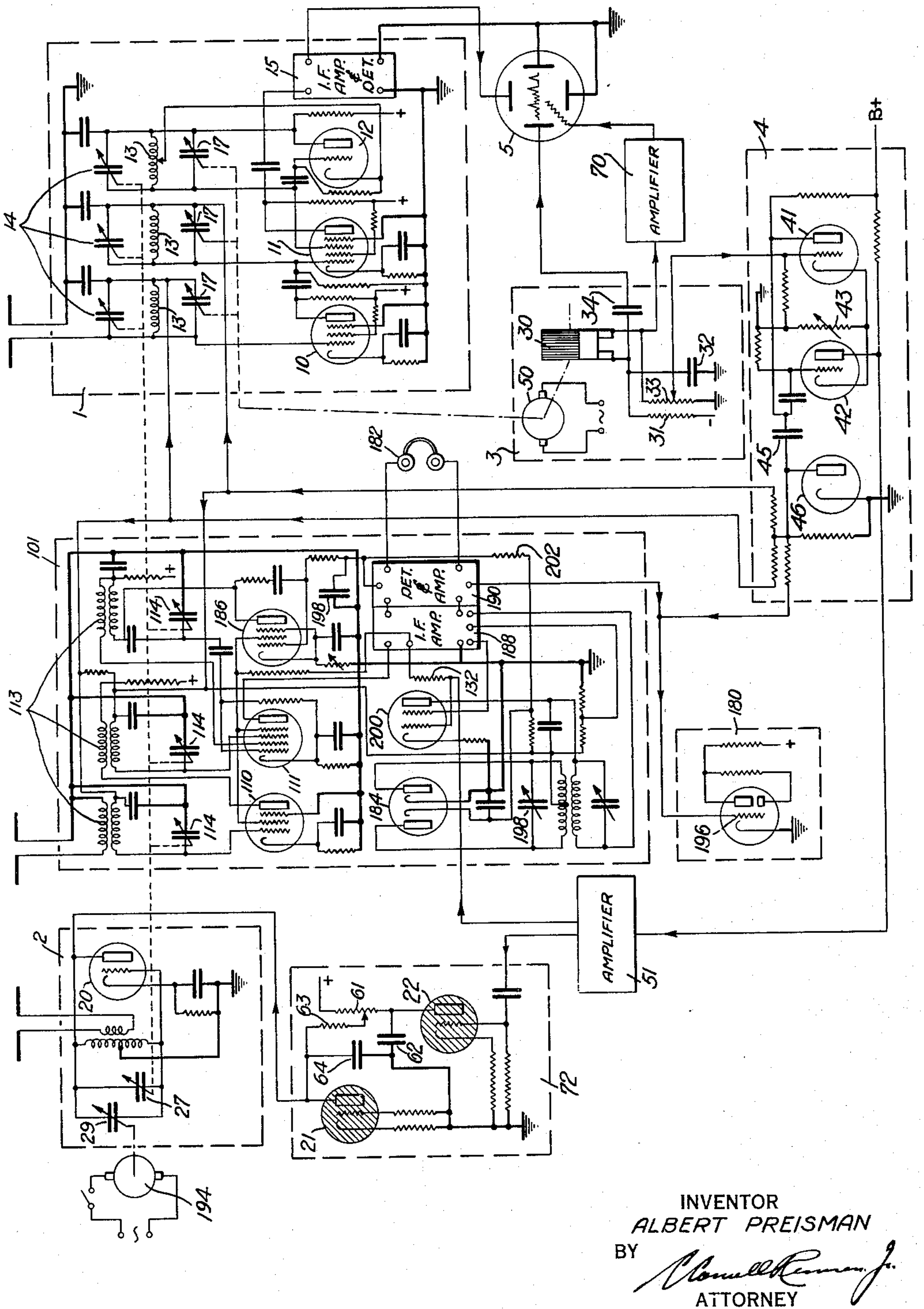
INVENTOR
ALBERT PREISMAN
BY [signature]
ATTORNEY United States Patent Office 2,953,677
Patented Sept. 20, 1960

2,953,677

RADIO JAMMING SYSTEMS

Albert Preisman, Flushing, N.Y., assignor to International Telephone and Telegraph Corporation, a corporation of Maryland Filed Jan. 4, 1943, Ser. No. 471,237
10 Claims. (Cl. 250—17)

This invention relates to radio jamming systems, and more particularly to a system for tuning the jamming transmitter to the exact frequency of the signal to be jammed.

An object of this invention is to provide a novel method and means for quickly, easily and accurately jamming a desired signal.

Another object of this invention is to provide a system which insures that the frequency of the jamming transmitter is exactly that of the signal to be jammed.

A further object of this invention is the provision of a novel arrangement for locking the tuning of the jamming transmitter with that of the receiver, so that the tuning of the receiver to the frequency of the signal to be jammed results in accurate tuning of the jamming transmitter to the same frequency.

More specifically, the invention contemplates the inclusion of an automatic frequency control network in the receiver, which is responsive to lock the tuning of the receiver to the frequency of the jamming transmitter but not to that of the received signal to be jammed, whereby a maximum reception by the receiver of the signal to be jammed at the receiver setting determined by the jamming transmitter frequency, is an assurance that the jamming transmitter frequency is the same as that of the signal to be jammed.

These and other objects and advantages of the present invention will be apparent from the following description of a preferred embodiment thereof, illustrated in the accompanying drawing, in which the single figure is a circuit diagram of a preferred form of jamming system in accordance with the present invention.

As shown in the drawing, the jamming system according to the present invention contemplates the use of two receivers, generally indicated at 1 and 101, and a jamming transmitter 2. The receiver 1, which may be termed a scanning receiver, is of the type which may be automatically tuned over a given frequency range to produce scanning indications on a cathode ray oscilloscope indicator 5. The transmitter 2 may be manually tuned simultaneously with the receiver 1 to maintain the frequency of the transmitter substantially in line with the mean frequency of the receiver 1. At 3 is shown a blank saw-tooth generator which serves to produce the sweep frequency for oscilloscope 5 and to synchronize the operation of a multi-vibrator 4 which serves to alternately block receivers 1 and 101, on the one hand, and transmitter 2 on the other hand.

The operation of the saw-tooth generator 3 and of the multi-vibrator 4 in connection with the receiver 1 and the transmitter 2 is disclosed and more fully explained in the copending application of Emile Labin, Serial No. 451,302, filed July 17, 1942, now U.S. Patent No. 2,412,991, and specifically forms no part of the present invention which is an improvement over the system disclosed in the aforesaid copending case. However, since an understanding of the operation of the saw-tooth generator and the multi-vibrator in connection with the scanning receiver and jamming transmitter is necessary for a full understanding of the improved system forming the present invention, a brief description of such operation will follow.

As disclosed in the aforesaid copending application, the saw-tooth generator 3 preferably comprises a rotating switch disk arrangement 30 which is one half conducting and one half insulating, as illustrated. This switch may be operated by a suitable source of power such as motor 50. A negative charging potential of relatively high value, for example, 1200 volts, is applied across a resistor 31 to charge condenser 32. The charge in condenser 32 slowly builds up until disk 30 rotates around to a conducting position, as shown in the drawing. Condenser 32 then immediately discharges over this disk in series with a relatively small resistor 33. The discharged condition of the condenser prevails then for another one half period, because of the conducting section of disk 30, after which the cycle is again repeated. It can thus be seen that the simple system serves to produce saw-tooth wave forms in which the alternate cycles are effectively blanked out. This saw-tooth voltage is then fed over a coupling condenser 34 to the horizontal scanning electrodes of indicator 5.

At the same time the condenser 32 discharges, a small portion of the voltage across resistor 33 is applied to the control grid of the tube 41 of the multi-vibrator circuit 4. These voltage peaks serve to synchronize the operation of the multi-vibrator 4 with the operation of the oscillograph 5. Multi-vibrator 4 comprises the two vacuum tubes 41 and 42 connnected so that their operation is controlled over a common cathode resistor 43, in the manner more fully described in the copending application of Emile Labin, Serial No. 449,595, filed July 3, 1942, now U.S. Patent No. 2,416,328.

These peak impulses occur during the straight return or fly-back of scanning of the oscillograph. In order to prevent this return stroke from showing on the indicator, impulses tapped from resistor 33 are fed over an amplifier 70 to a control grid of the oscillograph 5.

The output of multi-vibrator 4 is determined by the upward peaks occurring when the condenser 32 of the saw-tooth generator discharges across resistor 33, serving to key the multi-vibrator in one direction at the beginning of every second pulse of the blank saw-tooth wave. The reverse peaks coming from the resistor 33 serve to return the multi-vibrator to its initial condition at the end of the initiating saw-tooth oscillation. Thus, the multi-vibrator output from the tube 42 to amplifier 51 is positive substantially three-fourths of the time and negative one fourth of the time. The output wave is reversed in amplifier 51 prior to application to transmitter 2 and receiver 101 for blocking operation thereof. The output of amplifier 51 serves to key transmitter 2 and the automatic frequency control circuit of receiver 101 so that the transmitter and this circuit are effective substantially three-fourths of the time and blocked the other one quarter. The blocking operation will be described in more detail hereinafter. It is preferable in a system of jamming to have the transmitter on for a substantially longer period than the receiver, since in this way it is more difficult for enemy stations to carry on communication despite intereferences.

The output for blocking the receivers is taken from tube 41 of the multi-vibrator so that the one quarter period time is positive and the three-quarter period of time is negative. This output is fed over condenser 45 to the control grids of tubes 10 and 11 of receiver 1 and the control grids of tubes 110 and 111 of receiver 101. The blocking potential for the receivers is preferably made of such value that the blocking may be overcome so that the jamming signals may be received for monitoring purposes, as will be described more fully later. However, the receiver sensitivity is sufficiently reduced by the blocking signal so that ordinary reception can no longer take place. In order that negative voltages may be applied to the receiver during the long blocking intervals without influencing the normal receiver calls during the short intervening intervals when reception is desired, a rectifier 46 is provided in the output of the multi-vibrator to short-circuit the positive portions of the multi-vibrator wave applied thereto. The blocking potential from the multi-vibrator is also applied to the control grid 196 of a tuning indicator 180, connected to the receiver 101, for the purpose to be described in more detail hereinafter.

The receiver 1 may be of any suitable type provided, for example, with a radio frequency amplifier tube 10, a mixing tube 11 and an oscillator 12, the output of the mixing stage being applied to an intermediate frequency amplifier and detector generally indicated at 15. Signals received over the antenna of this receiver are applied across the vertical scanning plates of the oscillograph 5. The tuning circuits for tubes 10, 11 and 12 are represented by coils 13, variable condensers 14 and frequency scanning condensers 17.

The receiver 101 may be of a well-known type similar to or different from the receiver 1. It will preferably include a radio frequency amplifier tube 110, a convertor and oscillator tube 111, the output of which is applied to an intermediate frequency amplifier generally indicated at 188 which, in turn, is connected to a suitable second detector and amplifier 190. Signals received over the antenna of receiver 101 are applied to a suitable signal indicator such as the head phones 182 and the tuning of the receiver 101 is indicated upon a suitable tuning indicator 180, illustrated as being of the well-known cathode ray type. The tuning circuits for tubes 110 and 111 are represented by transformers 113 and variable condensers 114 mounted on a shaft which is rotatable with the shaft for variable condensers 14 of receiver 1. The receiver 101 is also provided with some well-known form of automatic frequency control embodying discriminator tube 184, reactance tube 186 and a shunt intermediate frequency tube 200. The general operation of such an automatic frequency control circuit illustrated is well-known to the art and need not be here described in any further detail.

The transmitter 2 has been illustrated as a simple oscillator, utilizing an oscillator 20 and a tuning condenser 27, adjustable simultaneously with the condensers 114 of receiver 101 and condensers 14 of receiver 1. A modulator 72 for producing modulating signals for modulating the jamming oscillator may be of the type more fully described in the copending application of Emile Labin, Serial No. 449,091, filed June 30, 1942, now Patent No. 2,416,327. A brief description is given herein, however, in order to more fully explain the operation of the entire system. A charging potential is applied over a resistance 61 to a condenser 62 causing a building-up of the voltage on a gas discharge tube 22, sufficient to breakdown this tube. This produces a relaxation oscillation of saw-tooth wave form which is preferably quite slow, for example, in the order of from ½ to 10 oscillations per second. The variable voltage output of tube 22 is then applied as the controlling potential on a second relaxation oscillator generator tube 21, also of the gas discharge type. The time constant of the second relaxation oscillator is determined by resistor 63 and condenser 64 and is preferably very short with respect to the time constant of the first relaxation oscillator. Preferably, this second relaxation generator is made of such a short period that the variable voltage applied from the first relaxation oscillator will cause the production of saw-tooth waves of the second oscillator to vary between about 800 and 1200 cycles per second during each scanning period of the first relaxation oscillator period. This saw-tooth modulation is applied by plate modulation to the power oscillator constituting vacuum tube 20 and its tank circuit.

The blocking signals for the transmitter are applied from the amplifier 51 to the grid of tube 22 to periodically block the operation of the transmitter during the periods when the receivers are operated. The short positive or blocking portion of the signal serves to maintain tube 22 conductive so that it operates as an ordinary triode and no potential builds up on condenser 62. The longer negative portion biases the grid of the tube 22 so that it normally carries no circuit and will periodically break down to provide the normal gas discharge tube function as a saw-tooth generator.

The general operation of the afore-described system will be as follows:

The receiver 1 is first manually adjusted by means of the variable condensers 14 to some desired mean frequency, at the same time tuning the receiver 101 and the transmitter 2 to approximately the same mean frequency. After tuning to this mean band, operation of the scanning condensers 17 which is effected by the motor 50 of the saw-tooth generator 3 serves to vary the tuning of the receiver 1 over a given frequency range simultaneously with the scanning of the cathode ray beam in oscillograph 5. Signals received from any station will then be indicated on the screen of the oscillograph by suitable peaks. When it is desired to identify one of the received signals, as indicated on the oscillograph 5, this may be done by the operator by a further tuning of the receivers and listening on the head phones 182. If it is then desired to jam one of the particular signals received, the receivers together with the transmitter are simultaneously tuned so that the frequency of the jamming transmitter 2 as indicated on the oscillograph 5 will appear to be approximately that of the frequency of the received signal to be jammed. It is to be noted in this connection, that, is previously mentioned, the receivers are not wholly blocked when the transmitter 2 is operating, so that an indication of the transmitter 2 will appear on the oscillograph 5, even though the receiver 1 is insensitive to other and more distant signals.

The operation described up to this point is substantially the same as the operation of the jamming system described in the afore-mentioned co-pending application Ser. No. 451,302, which utilized a single receiver, such as the receiver 1 and a jamming transmitter 2. It was found, however, that it was impossible to accurately tune the transmitter 2 to the exact frequency of the signal to be jammed, by means of the afore-mentioned system. It is the purpose of the present invention to provide an arrangement, utilizing the additional receiver 101 to insure the required accurate tuning of the transmitter. Thus, after an approximate indication has been given on the oscillograph 5, as described in the preceding paragraph, the operator turns his attention to the receiver 101. As previously described, the receiver 101 is provided with an automatic frequency control circuit. This circuit, however, is normally blocked when the receiver 101 is operative and only becomes unblocked when the transmitter 2 receives an unblocking pulse from the amplifier 51. The blocking and unblocking of the automatic frequency control circuit may be effected in several ways which will be obvious to those skilled in this art. In the circuit which has been illustrated by way of example, I have controlled the blocking and unblocking of the automatic frequency control circuit by the application of a variable bias to the grid resistor 132 of the intermediate amplifier tube 200, the biasing potential being derived from the amplifier 51 simultaneously with the application of an unblocking pulse from this amplifier to the transmitter 2.

Accordingly, when the receiver 101 is unblocked, the transmitter 2 being blocked, the receiver is tuned to the signal to be jammed so that a maximum indication is given on the tuning indicator 180 which will also be unblocked at this time. The automatic frequency control circuit will be inoperative at this time so that the receiver will not be locked into step with the incoming signal. When the transmitter 2 is unblocked and the receiver 101 is blocked so that the enemy signal is no longer heard, the automatic frequency control circuit is unblocked. As a result, the tuning of the receiver 101 will become locked to the frequency of the transmitter 2. Now, when the transmitter 2 becomes de-energized and the receiver 101 again becomes energized, the tuning of the latter will, for a short period, remain locked to the tuning of the transmitter, due to the inherent time delay of the automatic frequency control circuit as the differentiating potential slowly discharges across the condenser 198, the time constant being controlled by the resistor 202. Thus, although at this time the automatic frequency control circuit is again blocked it will hold the tuning of the receiver 101 to the tuning of the transmitter 2 and the tuning indicator 180 which is again operative will indicate whether or not this setting is the optimum tuning setting with respect to the enemy signal which is now being received. For example, if the tuning of the transmitter 2 is slightly off from the frequency of the signal to be jammed, the tuning indicator 180 will show that at the moment the receiver 101 becomes unblocked and for the period that the automatic frequency control circuit still locks the tuning of the receiver to that of the transmitter 2, the receiver, and thus the transmitter, are not accurately tuned to the incoming enemy signal. During this period the tuning indicator will give a wide shadow, while as soon as the effect of the automatic frequency control circuit has worn off and the receiver is now tuned to the incoming enemy signal, the shadow on the indicator 180 will become narrow. If, on the other hand, the transmitter frequency is identical with that of the signal to be jammed and received by the receiver 101, the tuning indicator 180 will be at its sharpest while the automatic frequency control circuit still locks the receiver 101 with the transmitter 2, and will stay at this illumination when the locking effect of the automatic frequency control circuit diminishes. If the tuning indicator 180 shows that there is a frequency difference between the transmitter 2 and the signal to be jammed, the receiver 101 and the transmitter 2 are commonly tuned to remove the difference, until optimum sharpness of the indicator 180 is obtained for all conditions.

The system, as described above, is completely adequate for jamming amplitude modulated signals. If frequency modulated signals are to be jammed, it is desirable to wobble the carrier frequency from the transmitter 2. For this purpose a small variable condenser 29 is provided in shunt with the condenser 27. This condenser may be continuously tuned by means such as a motor 194 to wobble the carrier frequency both sides of its normal mean position. This will then serve to jam frequency modulated waves as well as those which are amplitude modulated. It is preferable when amplitude modulated waves alone are to be jammed to permit the transmitter to operate at a steadier carrier frequency since the frequency wobbling of the carrier serves somewhat to reduce the effectiveness of the system.

While I have described above a preferred embodiment of my invention, it is to be clearly understood this serves merely by way of illustration and is not intended to define the scope of my invention. It is cltar, for example, that other types of saw-tooth generators and multi-vibrators may be used. The specific details of the individual receivers are also unimportant, it only being necessary that the tuning receiver, as contrasted with the scanning receiver, be provided with automatic frequency control means for locking the same with the transmitter. Various types of automatic frequency control circuits other than that illustrated are known to the art, and it is contemplated that such other well known circuits may be used in place of the specific circuit illustrated. Other jamming signal transmitters than the specific form shown are also known to the art and may be used in the present system in place of the specific one described.

It is also contemplated that the jamming system may consist of the receiver 101 together with a suitable jamming transmitter without the use of a scanning receiver. The scanning receiver assists in finding the station it is desired to jam, but in some instances a tuning receiver such as the receiver 101 can be used and alone is suitable for the purpose.

Accordingly, while I have described above the principles of my invention in connection with specific apparatus, it is to be clearly understood that this description is made only by way of example and not as a limitation on the scope of my invention as set forth in the objects and the accompanying claims.

What is claimed is:

1. A radio system comprising, in combination, a transmitter and two adjacently located receivers, one of said receivers including means for tuning the receiver and means for continually scanning a frequency band determined by said tuning means, indicator means connected to said one receiver for indicating the reception of a signal within the scanning frequency band, means for alternately blocking said transmitter on the one hand and partially blocking both said receivers on the other hand, whereby, when said receivers are partially blocked they will still receive the signals from the adjacently located transmitter, common means for tuning said transmitter and said receivers, means connected to said second receiver for identifying a received sginal, a tuning indicator connected to said second receiver, means for rendering said tuning indicator ineffective when said transmitter is operating, normally blocked automatic frequency control means for said second receiver, and means for rendering the said automatic frequency control means effective whenever said transmitter is unblocked and said receiver is partially blocked.

2. The combination according to claim 1, in which said automatic frequency control means includes means for maintaining the tuning of said second receiver locked to the frequency of said transmitter after said transmitter is blocked for a predetermined time after said second receiver is operative.

3. The combination according to claim 1, in which said blocking means includes a multi-vibrator and means for energizing the same.

4. The combination according to claim 1, in which said tuning indicator is a cathode ray tube.

5. A radio system including, in combination, a tunable transmitter, a tunable receiver, common means for tuning both transmitter and receiver, means for alternately blocking said transmitter and partially blocking said receiver, a tuning indicator connected to said receiver, means for blocking said tuning indicator when said transmitter is unblocked, normally blocked automatic frequency control means connected to said receiver, and means for unblocking the automatic frequency control means whenever said transmitter is unblocked and said receiver is partially blocked.

6. The combination according to claim 5, in which said automatic frequency control means includes means for maintaining the tuning of said second receiver locked to the frequency of said transmitter after said transmitter is blocked for a predetermined time and said second receiver is operative.

7. The combination according to claim 5, in which said blocking means includes a multi-vibrator and means for energizing the same.

8. The combination according to claim 5, in which said tuning indicator is a cathode ray tube.

9. The method of jamming which includes the steps of detective tuning for signal reception at different tuning points over a given frequency range, scanning the tuned frequency from one side to the other of each tuning point over a predetermined band, transmitting a jamming signal at the frequency of a selected tuning point, alternately receiving the signal to be jammed and transmitting the jamming signal, identifying the received signal, comparing the received signal with the jamming signal, locking the transmitting operation to the tuned reception of the signal to be jammed, and tuning the transmitting operation by tuning for maximum signal reception.

10. The method of jamming which includes the steps of detecting a signal to be jammed and simultaneously transmitting a jamming signal at the frequency of the detected signal, alternately, blocking the transmission of the jamming signal and partially blocking the reception of the signal to be jammed, locking the transmitting operation to the tuned reception of the signal to be jammed, and tuning the transmitting operation by tuning for maximum signal reception.

References Cited in the file of this patent

UNITED STATES PATENTS 2,230,243 Haffcke ---------------- Feb. 4, 1941